(12) United States Patent
Winner et al.

(10) Patent No.: US 6,278,901 B1
(45) Date of Patent: Aug. 21, 2001

(54) METHODS FOR CREATING AGGREGATE PLANS USEFUL IN MANUFACTURING ENVIRONMENTS

(75) Inventors: Jeffrey B. Winner, Los Altos Hills; Phillip C. Nelson, San Jose; Cristos J. Goodrow, San Francisco, all of CA (US)

(73) Assignee: Impresse Corporation, Sunnyvale, CA (US)

( * ) Notice: Subject to any disclaimer, the term of this patent is extended or adjusted under 35 U.S.C. 154(b) by 0 days.

(21) Appl. No.: 09/215,747

(22) Filed: Dec. 18, 1998

(51) Int. Cl.[7] .................................................. G06F 19/00
(52) U.S. Cl. ........................................... 700/99; 700/100
(58) Field of Search .................. 700/2, 94, 95, 700/99, 108, 100, 103, 106, 107; 705/7–9, 28, 29

(56) References Cited

U.S. PATENT DOCUMENTS

| T918,004 | 1/1974 | Chappell et al. . |
|---|---|---|
| 3,581,072 | 5/1971 | Nymeyer . |

(List continued on next page.)

FOREIGN PATENT DOCUMENTS

| 0 517 953 A2 | 12/1992 | (EP) . |
|---|---|---|
| 09034953 | 2/1997 | (JP) . |
| 11110451 | 4/1999 | (JP) . |
| WO 96/10793 | 4/1996 | (WO) . |
| WO 96/16365 | 5/1996 | (WO) . |
| WO 97/07472 | 2/1997 | (WO) . |
| WO 97/28506 | 8/1997 | (WO) . |
| WO 97/29441 | 8/1997 | (WO) . |
| WO 97/31322 | 8/1997 | (WO) . |

OTHER PUBLICATIONS

Guandong Liu, A Practical Approach for Integrated Order and Production Scheduling Problems, IEEE, pp. 101–105, Jun. 1994.*
Christopher Lozinski and C. Roger Glassey, Bottleneck Starvation Indicators for Shop Floor Control, IEEE, pp. 147–153, Nov. 1988.*
"A Fine Mes", State of the Art; JIm Esch; Petersborough, NH, US; No. 12; pp. 67, 68, 70, 74, 75, Date unknown.
"Simulation System for Real–Time Planning, Scheduling, and Control"; Glenn R. Drake and Jeffrey S. Smith; pp. 1083–1090, Date unknown.
"Electronic Contracting with COSMOS–How To Establish, Negotiate and Execute Electronic Contracts on the Internet"; F. Griffel, M. Boger, H. Weinrcich, W. Lamersdorf and M. Merz; XP–002129707; pp. 46–55 Date unknown.
PCT International Search Report; International Application No. PCT/US 99/24177; Apr. 6, 2000.

(List continued on next page.)

Primary Examiner—Paul P. Gordon
(74) Attorney, Agent, or Firm—Blakely Sokoloff Taylor & Zafman LLP

(57) ABSTRACT

An aggregate plan for a set of job requests to be processed in a manufacturing environment may be produced given capacities for resources of the manufacturing environment, the capacities being represented by bins in multiple dimensions, some of which may be used by the jobs on an alternative basis. In such a scheme, producing the aggregate plan may be accomplished by selecting a subset of the job requests according to a procedure for packing the bins. For example, packing the bins may be accomplished by selecting from among ordered lists of the job requests grouped according to costs for one or more of the resources. The ordered lists of job requests may be ordered in terms of value. In some cases, at least some of the job requests may have different values versus cost for different ones of the resources. Each alternative be represented as a separate bin. A detailed schedule may be developed from the aggregate plan, the detailed schedule differing from the aggregate plan by including a timeline for the selected jobs.

16 Claims, 7 Drawing Sheets

U.S. PATENT DOCUMENTS

| | | |
|---|---|---|
| 3,703,006 | 11/1972 | Sharma . |
| 3,703,725 | 11/1972 | Gomersall et al. ........................ 441/1 |
| 3,905,045 | 9/1975 | Nickel . |
| 3,930,251 | 12/1975 | Salava et al. . |
| 3,988,570 | 10/1976 | Murphy et al. . |
| 4,007,362 | 2/1977 | Sindermann . |
| 4,017,831 | 4/1977 | Tieden et al. . |
| 4,231,096 | 10/1980 | Hansen et al. . |
| 4,400,783 | 8/1983 | Locke, Jr. et al. . |
| 4,433,426 | 2/1984 | Forster . |
| 4,449,186 | 5/1984 | Kelly et al. . |
| 4,468,750 | 8/1984 | Chamoff et al. . |
| 4,475,756 | 10/1984 | Federico et al. . |
| 4,484,522 | 11/1984 | Simeth . |
| 4,495,582 | 1/1985 | Dessert et al. . |
| 4,578,768 | 3/1986 | Racine . |
| 4,584,648 | 4/1986 | Dlugos . |
| 4,601,003 | 7/1986 | Yoneyama et al . . |
| 4,796,194 | 1/1989 | Atherton ............................... 364/468 |
| 4,827,423 * | 5/1989 | Beasley et al. ........................ 700/95 |
| 4,839,829 | 6/1989 | Freedman . |
| 5,229,948 | 7/1993 | Wei et al. ............................ 364/468 |
| 5,291,397 | 3/1994 | Powell ................................. 364/402 |
| 5,432,887 | 7/1995 | Khaw .................................... 395/11 |
| 5,463,555 | 10/1995 | Ward et al. ........................... 364/468 |
| 5,524,077 * | 6/1996 | Faaland et al. ........................ 700/94 |
| 5,794,207 | 8/1998 | Walker et al. ......................... 705/23 |
| 5,826,040 * | 10/2000 | Fargher et al. ......................... 705/8 |
| 5,946,661 * | 8/1999 | Rothschild et al. ..................... 705/7 |
| 6,137,588 * | 10/2000 | Fargher et al. ......................... 705/8 |

OTHER PUBLICATIONS

PCT International Search Report; International Application No. PCT/US 99/24178; Apr. 6, 2000.

PCT International Search Report; International Application No. PCT/US 99/24193; Feb. 5, 2000.

PCT International Search Report; International Application No. PCT/US 99/24131 Dec. 4, 1998.

PCT International Search Report; International Application No. PCT/US 24132; Feb. 22, 2000.

"A Knowledge Based, Integrated Process Planning and Scheduling System for Document Preparation"; Roger M. Kerr; XP–000892975; pp. 497–506 Date unknown.

"Heuristic Knowledge Representation of Production Scheduling: An Integrated Modeling Approach"; Sung Joo Park and Jong Woo Kim; XP–000893055; pp. 325–339.

XP–002130869; 1 page Date unknown.

"From Contemporary Workflow Process Automation to Adaptive and Dynamic Work Activity Coordination and Collaboratin"; Amit Sheth; XP–002135795 pp. 24–27 Date unknown.

Towards Evolutionary and Adaptive Workflow Systems—Infrastructure Support Based on Higher–Order Object Nets and CORBA; Ingo ClaBen, Herbert Weber and Yanbo Han, XP–002135793; pp. 300–308 Date unknown.

* cited by examiner

METHODS FOR CREATING AGGREGATE PLANS USEFUL IN MANUFACTURING ENVIRONMENTS

FIELD OF THE INVENTION

The present invention involves the automated selection of jobs for execution in a manufacturing environment using a declarative description of the environment and/or updates regarding the current status of jobs being executed within the environment.

BACKGROUND

Within manufacturing plants, deciding what products to produce (assuming the plant is capable of producing more than a single product), when to produce them, how much of each to produce and whether to accept new orders for different products are questions that continually confront the owners and operators thereof. Many times, these questions are complicated by the fact that different products have different associated costs and values. Further, such plants are often faced with requests to produce many more products than can reasonably be manufactured in a given time frame. Thus, the challenge is to decide how best to employ the available resources for the tasks presented. Stated differently, the question is how to select a "best" subset of the available jobs for completion (and, perhaps, in what order to execute them).

In some cases, aggregate planning techniques have been used to help answer such questions. Aggregate planning may be characterized as the development of a plan for plant operations for given time periods. The goal may be to develop a plan that minimizes cost while meeting the demands of the jobs to be processed. Although useful, many current aggregate planning solutions are computationally intensive. For example, although "brute force" techniques could be used to select from among a list of possible jobs, where the number of jobs is anything more than trivial, these techniques simply require too much processing time to be of much benefit. Further, "trial and error" solutions, although perhaps easier to implement, often require too long to develop and/or update. Thus, what is required is an aggregate planning solution that avoids such drawbacks.

SUMMARY OF THE INVENTION

Discussed herein is scheme wherein an aggregate plan for a set of job requests to be processed in a manufacturing environment (e.g., a print shop) may be produced given capacities for resources of the manufacturing environment, the capacities being represented by bins in multiple dimensions, some of which may be used by the jobs on an alternative basis. In such a scheme, producing the aggregate plan may be accomplished by selecting a subset of the job requests according to a bin packing procedure. For example, bin packing may be accomplished by selecting from among ordered lists of the job requests grouped according to costs for one or more of the resources. The ordered lists of job requests may be ordered in terms of value. In some cases, at least some of the job requests may have different values versus cost for different ones of the resources. Each alternative may be represented as a separate bin.

The scheme may also include developing a detailed schedule from the aggregate plan, the detailed schedule differing from the aggregate plan by including start and end times for the selected jobs. In some cases, the manufacturing environment may be represented by a declarative model including a first number of state nodes and a second number of task nodes interconnected with the state nodes, the bins being associated with the task nodes. Alternatively, the manufacturing environment may be represented by a model that includes the resources consumed by the job requests.

Ultimately, workflows may be generated from the detailed schedule. The workflows represent procedural steps to accomplish the process to be performed within the manufacturing environment. In such cases, generating a workflow may be accomplished by choosing one of a number of paths through the model (e.g., using the hierarchical aggregate planning and detailed scheduling approach), each of the paths comprising an alternating series of one or more of the state nodes and one or more of the task nodes with any predecessor state node in one of the paths representing a precondition for a subsequent task node along the one of the paths and any following state node of the subsequent task node along the one of the paths representing a result of applying one or more actions that correspond to that task node.

In general though, any of a number of model representations may be used. Thus, generating a workflow may be accomplished by choosing any one of a plurality of feasible routes for completion of the process defined by the model; by choosing an optimal one of a plurality of routes for completion of the process defined by the model; or by choosing one of a plurality of routes defined by the model according to one or more user-defined criteria for route selection. The routes so chosen may define bills of resources for the real world environment defined by the model. New workflows may be generated in response to an update to the model.

Further details of these and other embodiments will be discussed below, however, it should be remembered that these are merely examples of implementations of the present invention.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
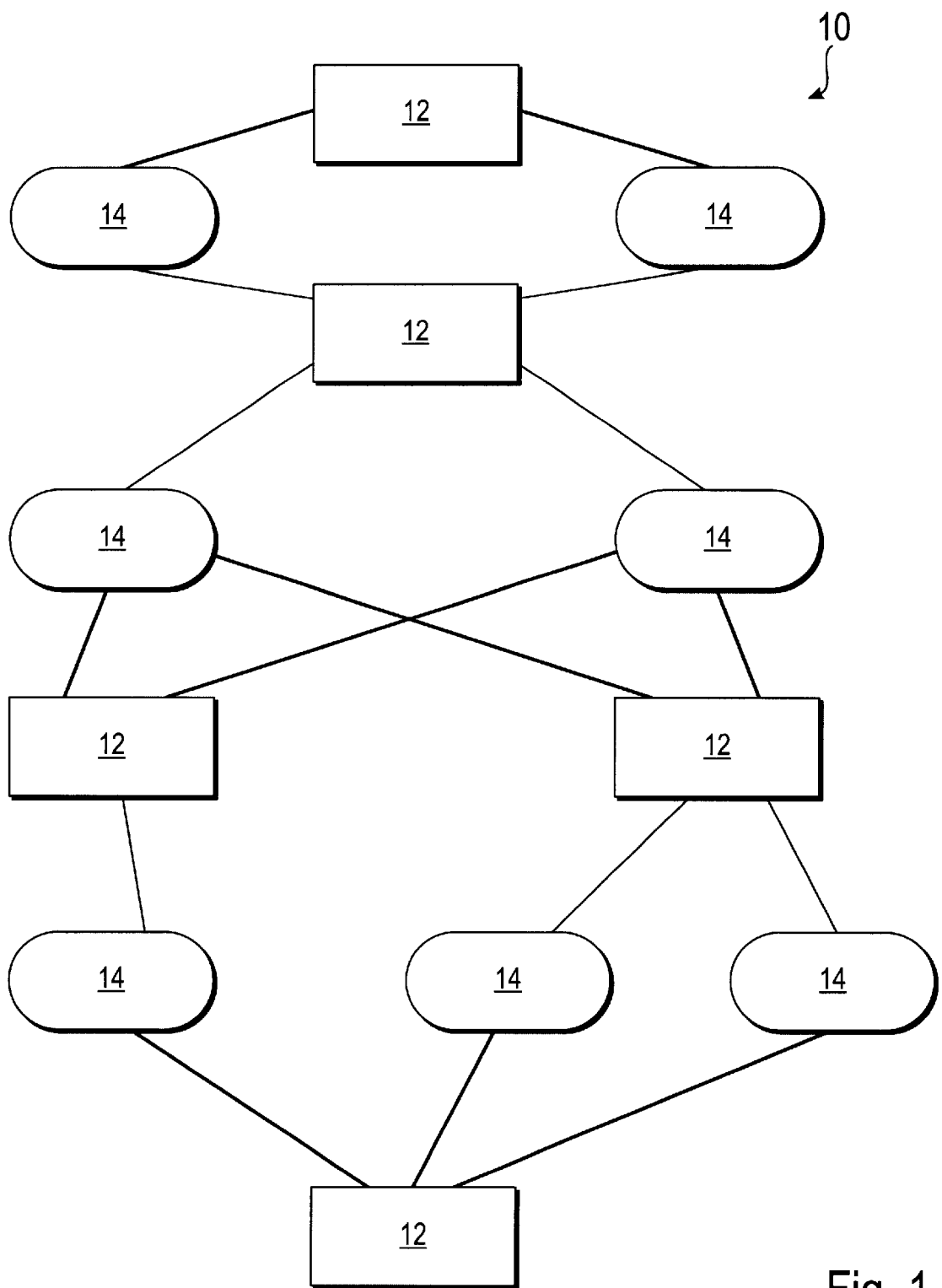
FIG. 1 illustrates a model having task nodes and state nodes organized for use according to an embodiment of the present invention.

Methods of producing aggregate plans for sets of jobs to be performed in a real world environment are described below. Many of the techniques so discussed make reference to a manufacturing environment (and, in particular, a print shop environment) in which similar types of products are produced in similar ways. However, upon review of this specification, those of ordinary skill in the art will recognize that the planning techniques discussed herein may find application in a variety of environments. Therefore, in considering the following description, it should be remembered that the illustrated embodiments should be regarded as examples only, and should not be deemed to limit the scope of the present invention.

Before describing the aggregate planning scheme in detail, it is helpful to present an overview. The planning methodologies make use of a declarative model of the real world environment. The model is used to generate detailed schedules and workflows, i.e., procedural steps to be followed in accomplishing the process defined by the model. In one embodiment, the model may be regarded as a directed graph made up of state nodes and task nodes. The task nodes and state nodes are interconnected with one another in such a way so as to define one or more paths through the directed graph, with each path defining a route to a completed product. Each of the paths includes an alternating series of one or more of the state nodes and one or more of the task nodes. In some cases, two or more of the paths may share one or more task nodes and/or state nodes.

Generating the actual workflows may be accomplished using a scheduler that is permitted to access the model. The scheduler uses rules to determine the criteria by which the workflows are produced. In some cases, generating the workflows may involve choosing any of a number of feasible routes defined by the model. However, in other cases, more sophisticated criteria for workflow generation, such as optimizing for cost, value, execution time and/or other (e.g., user-defined) criteria may be specified and workflows generated accordingly.

Because of the complexity of the scheduling task, the present scheme employs a hierarchical methodology in which an aggregate plan is first produced. Using the aggregate plan, a detailed schedule for the job requests may then be determined. The aggregate plan is arrived at through the use of a multidimensional bin packing scheme that accommodates contingencies. The "bins" represent the manufacturing processes represented in the model. Thus, given a list of possible jobs to be performed, the multiple possible ways in which those jobs may be performed in terms of the resources they use and consume, and the capacities of those resources, the bin packing scheme is applied in order to arrive at an aggregate plan for doing the jobs. In so producing the aggregate plan, certain optimizations are employed to arrive at a solution relatively quickly (e.g., compared to planning schemes of the past). From the aggregate plan, a detailed schedule (i.e., one that includes start and end times, etc.) may be produced. Importantly, the plan may be continually updated to account for changes in the real world environment.

To better understand the above-described method, first consider a hypothetical print shop. The print shop includes a number of machines, which are used in the printing of books and similar articles. For example, the print shop includes a number of printers, each of which is capable of producing a document, printed on paper or another material, from a computer readable file (e.g., a PostScript™ file). In addition, the print shop includes special printers for producing covers. Besides printers, the print shop may include machines for binding the various documents and covers together and other machines for cutting the resulting products to size. In general, all of the products (e.g., books) produced by the print shop are produced using similar processes, but any of the end products may be created in any of a variety of ways. For example depending upon the availability of resources (e.g., the printing, binding and cutting machines) and materials (e.g., paper and ink for the printers, cover stock, etc.) one route may be chosen over another. Thus, the print shop is an example of a homogeneous manufacturing environment.

Consider now the following scenario. A number of jobs, perhaps each at various stages of completion and each having certain deadlines for completion, are waiting to be processed. Each job has an associated cost of completion and each completed job has an associated value. Any job not completed on time carries an associated penalty, which may or may not have a linear relationship with the delay. The task facing the owner of the hypothetical print shop then, is to decide how best to employ the available resources and materials to complete the existing job requests within their designated time frames, while optimizing for value/cost. In other words, the print shop owner needs to decide what work to do, when to do it, what resources to apply/utilize, etc., to complete the products. To this task can be added the complication that while the shop is running, and without disrupting inprogress operations, the print shop owner would like to be able to accept new orders, each of which will carry its own completion time deadlines, costs and values.

To assist the print shop owner in these and other matters, the model illustrated in FIG. 1 is introduced. Model 10 represents the print shop environment in terms of its bill of materials and bill of resources. Stated differently, model 10 represents the print shop jobs to be performed in terms of the resources those jobs consume, along with the alternative paths therefor. It should be appreciated that model 10 may be instantiated as a computer-readable file and may thus be regarded as a virtual representation of the bill of materials and bill of resources. Importantly, the manner in which the inventory items that make up the bill of materials are interconnected to tasks that make up the bill of resources implicitly defines the workflow in the print shop.

Before going further, it is helpful to define some terms. A bill of materials, as used herein, is a summary that defines a product structure. More than merely a parts list, a bill of materials provides some idea of how a product is assembled from its constituent parts. In some cases, it may indicate the types and quantities of subassemblies required to produce the product. Although the bill of materials shows the assembly chain for the product, it does not provide any information as to how or when the assembly is to be completed. A bill of resources on the other hand, is a precise list of the available reusable resources that may be employed to assemble the product. For example, the various machines that are located on the print shop floor comprise at least a portion of the print shop's bill of resources. In some cases, outside vendors and suppliers may be part of the bill of resources.

Workflows then may be regarded as detailed sets of instructions for how to assemble the product of interest. The workflow specifies the order in which various resources are employed to produce the items on the bill of materials and, hence, acts as assembly instructions for the product. Model 10 is unique in that it integrates a bill of materials with a bill of resources to provide a logical flow structure that may be easily used to identify available workflows. That is, one or more workflows may be regarded as instances of the model.

Returning to FIG. 1, model 10 includes a collection of state nodes 12 and task nodes 14. The nodes 12 and 14 are interconnected in such a fashion so as to form a state transition graph. That is, task nodes 14 define processes or actions by which predecessor state nodes 12 are transformed to successor state nodes 12. The processes or actions defined by the task nodes 14 are those associated with the available resources of the manufacturing or other process defined by model 10 (e.g., the print shop machines and/or their associated operators for the above print shop example). Thus, in model 10, the state nodes 12 represent intermediate states (or milestones) which have been identified as comprising the bill of materials. All state nodes 12 are the outcome or result of a task node 14.

In model 10, state nodes 12 and task nodes 14 always appear in alternating order as one proceeds along a path through the model. Paths are defined as complete routes to a final product and therefore may be regarded as workflows or production plans. Separating the state nodes 12 and task nodes 14 in this fashion provides clarity in the logical semantics of parallel paths. For example, all inputs to a task node 14 represent logical AND requirements. That is, the action associated with a given task node 14 cannot be performed until all of the associated inventory items represented by the state nodes 12 which feed the task node 14 are available. All inputs to a state node 12, on the other hand, represent logical ORs. That is, the inventory item defined by a given state node 12 may be produced by any of the actions associated with any immediate predecessor task node 14.

In model 10, state nodes are represented using rectangles while task nodes are represented using ovals. The logical flows that interconnect the nodes are depicted with thick lines representing logical ANDs and thin lines representing logical ORs.

Those of ordinary skill in the art will appreciate that model 10 may exist as a virtual representation of the associated manufacturing environment, for example, as may be present in a computer system, a computer-readable storage medium or other database environment. In some cases, model 10 may exist in various component parts in one or more locations of a distributed processing environment. Regardless of its physical location or makeup, however, it should be appreciated that model 10 may be continuously updated with information regarding the real-world manufacturing environment that it represents. In this way, as resources are taken off line or added, model 10 is available to identify new production plans.

Within the virtual representation, a task node 14 may be defined with various attributes. For example, each task node may have an associated resource that actually performs the actions represented by the task node. In addition, each task node 14 will have an associated capacity, which may represent the resource's required time for completing the task. Such information may become useful for identifying and avoiding bottlenecks in the manufacturing environment when using model 10 to plan/schedule multiple jobs. The task nodes 14 also have defined predecessors, which in this case are represented by the state nodes 12. As indicated above, however, the attribute list need not include semantic definitions, because the structure of model 10 is such that the node type inherently defines the logical semantics. Other attributes relating to the rules and variants associated with each task node 14 may also be included.

State nodes 12 may also have associated attributes. Among these may be an indication of predecessor and/or successor actions/events. Other rules may also form attributes. In general, all nodes of model 10 will have associated rules and each rule may be associated with a successor node of the model. During processing of a real world job in the manufacturing environment represented by model 10, after an action associated with a node has been completed, all rules of the node may be evaluated. If a rule is satisfied, the job may be passed to the successor node associated with the rule. If more than one rule is satisfied, the job may be passed to multiple successor nodes, as represented by the existence of multiple parallel paths in the model 10.

Within this representation, each manufacturing process represented by a task node 14 requires certain resources to complete its associated task. These resources may be divided into materials and assets. Materials are those items which can be used only once (i.e., consumables) and are completely used up by the task that uses them. In the print shop environment, examples of materials include paper, toner (for the printers, etc.) and RIPed (raster imaged processed) images, etc. Assets are those resources that are not consumed by the processes that use them. Examples include the actual print machines, the physical plant, operators, etc. (i.e., assets are reusable resources). Both materials and assets may be represented in model 10.

To summarize, within the alternating structure of state nodes and task nodes, a predecessor state node in one of the paths (i.e., workflows) represents a precondition for a subsequent task node along that path. Similarly, a state node following a preceding task node along the one of the paths represents a result of applying one or more actions (e.g., manufacturing processes or sub-processes) that correspond to that task node. State nodes and task nodes may be chosen to represent any appropriate level of item or material (in the case of state nodes) or process (in the case of task nodes). In one embodiment, for example, task nodes are introduced into the model to represent significant steps in the processing of materials in the manufacturing environment.

It is important to recognize that the manufacturing processes or sub-processes represented by the individual task nodes may correspond to on-site or off-site processes (e.g., where subcontractors or remote manufacturing facilities may be employed). In general then, each task node represents a transformation process for an item or material from a preceding state to a following state. The present model is flexible in that multiple task nodes may be used to represent multiple ways of transforming the item or material from the preceding state to the following state. In other words, different actions or processes (whether performed by humans, machines or both) that lead to the same result may be represented by different task nodes, or, if preferable, by the same task node (e.g., depending upon the granularity of the model chosen to represent a particular manufacturing environment). Indeed, because of this flexibility, the model may be hierarchically arranged such that each task node may be expanded to its own directed graph representation using the model structure described herein.

Another interesting feature of the present model is the manner in which the logical semantics of the routes defined by the directed graph are implicit in the model structure itself. For example, all inputs to a task node implicitly represent logical AND requirements. Because of the hierarchy defined by the directed graph, it is axiomatic that the action (or actions) associated with a particular task node cannot be performed until all of the associated materials or items represented by the state nodes which feed that task node are available. The model structure itself makes this logical argument explicit, without having to introduce additional attributes when defining the task node. All inputs to a state node, on the other hand, represent logical ORs. That is, the inventory item or material defined by a particular state node may be produced by any of the actions associated with any immediate predecessor task nodes. Again, the structure of the present model itself defines these relationships, without requiring any additional defining attributes for a state node.

Figure 2:
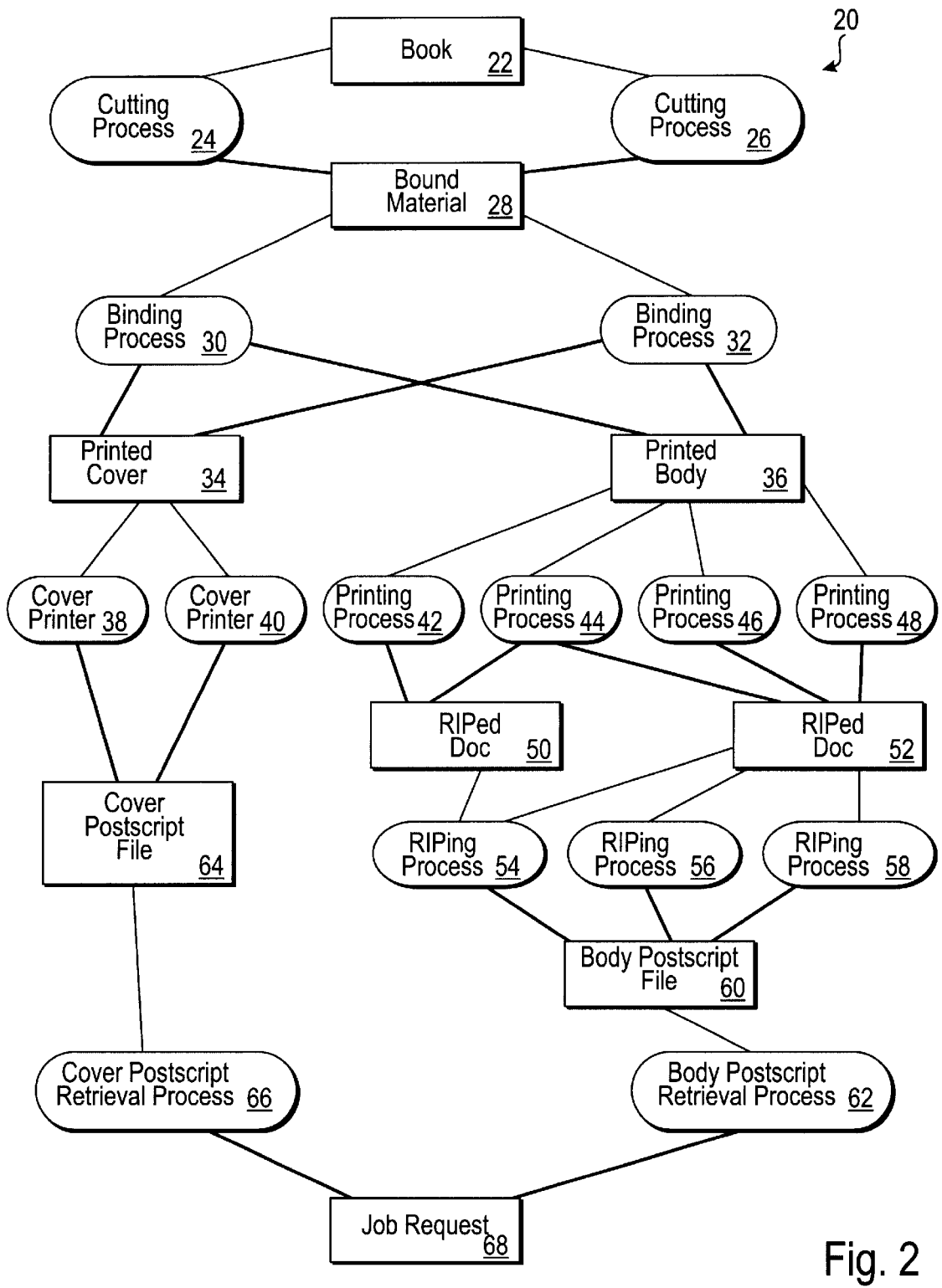
FIG. 2 illustrates a detailed model of a hypothetical print shop environment.

FIG. 2 presents a fully detailed model 20 of the hypothetical print shop. Model 20 is created using a "top-down" approach, wherein the end product, book 22, is regarded as the outcome of the entire manufacturing process. Model 20 is illustrated using the state node/task node representation discussed above, where inventory items which make up the bill of materials for a book 22 are represented using rectangles and manufacturing processes which act on the inventory items are represented using ovals. Similar logical flows to those discussed above are inherent in the node structure and are represented in model 20 with thick lines representing logical ANDs and thin lines representing logical ORs.

Having decided that book 22 represents the final state (i.e., the output of the print shop manufacturing environment), it is recognized that this state must be the result of some action. In the print shop hypothetical, a book is produced once it is cut to shape; thus, book 22 is the result of one of either of two cutting processes 24 or 26. Notice that model 20 accurately reflects the logical OR nature of these alternative processes.

Because all task nodes (by which cutting processes 24 and 26 are represented in model 20) represent actions that are employed on one or more items of a bill of materials, it follows that the inputs to cutting processes 24 and 26 must be represented by state nodes. In this case, before a book can be cut to size by either of cutting processes 24 or 26, some bound material 28 must exist. The bound material 28 is represented in model 20 by the predecessor state node to the task nodes associated with the two cutting processes. Notice that the logical AND requirement for the bound material is also represented in model 20, thus illustrating the need for the bound material 28 to exist before the cutting process may be commenced.

If bound material 28 is available, it follows that some binding process must have been applied. Thus, model 20 accommodates the act of binding with task nodes representing two hypothetical alternative binding processes 30 and 32. As shown, these processes act on the predecessor inventory items, namely printed cover 34 and printed body 36. Here, the body of the book 22 refers to all material included within the cover. The printed cover 34 and printed body 36 are represented using appropriate state nodes and the various logical combinations of these items, which may be acted upon by the two binding processes are also illustrated. It should be appreciated, however, that the very node definition will lead to the logical flow illustrated in model 20 and no additional rules need be defined.

Both the printed cover 34 and the printed body 36 are the result of independent printing processes. For example, printed cover 34 may be produced by either of cover printing processes 38 or 40, while printed body 36 may be produced by any of printing processes 42, 44, 46 or 48. Thus, appropriate task node representing these various processes are introduced into model 20. Again, the node definition itself has provided an immediate indication of the logical paths available within the manufacturing process.

The printing processes 42, 44, 46 and 48 each act upon a RIPed document, although some printing processes may only act upon certain types of RIPed documents. In the hypothetical print shop environment, two types of RIPed documents 50 and 52 may be produced, but each by independent RIPing processes 54, 56 and 58. Thus, these individual inventory items are represented by state nodes assigned to the RIPed documents 50 and 52 and the various RIPing processes 54, 56 and 58 are represented using appropriate task node.

The RIPing processes themselves act upon PostScript files 60, represented by an appropriate state node. The PostScript file 60 is produced in response to a retrieval process 62, such as loading a PostScript file.

For the cover, no RIPing process is required; thus printed cover 34 is produced directly from a cover PostScript file 64. As for the body PostScript file, cover PostScript file 64 is retrieved by a retrieval process 66. The retrieval processes 62 and 66 are carried out in response to a job request 64.

Notice then that model 20 may be created by examining the prerequisites and/or preconditions that must exist in order to execute a particular task, and also determining the actions that are required to arrive at a particular inventory item. These prerequisites and actions are then combined in the logical hierarchy discussed above to form a single model in which the bill of materials (represented by the individual inventory items) and the bill of resources (represented by the collection of actions) are integrated with one another. This procedure may be applied to any manufacturing process, but is especially applicable to homogeneous manufacturing processes such as the print shop example, because a number of products may be produced using similar processes.

Although model 20 has not illustrated the integration of consumables, such integration is easily achieved. For example, consumables may be represented as predecessor state nodes to the tasks that consume them. Thus, any or all of the printing processes 42, 44, 46 and/or 48 may draw upon paper, toner and other materials in addition to the RIPed documents. Such materials may be represented as state nodes similar to the RIPed documents 50 and 52, with the exception that the state would have to be defined to indicate its consumable status. Thus, in some embodiments, state nodes representing consumables may be implemented so that their available/not available status must be defined prior to execution of a subsequent task. Preferably, direct feedback from the manufacturing environment may be used to update this status in real time.

From the above, it should be apparent that when the present model is used to represent a real-world manufacturing environment, any route through the model to a completed product automatically provides a complete bill of materials and bill of resources for that product. Further, alternative routes (and, hence, alternative bills of materials and bills of resources) are also provided. Thus, a scheduler may make use of the model to assist in the efficient employment of resources within the manufacturing environment. In essence, the scheduler will be required to perform route selection according to rules by which such routes may be chosen to achieve desirable or optimal results.

Figure 3:
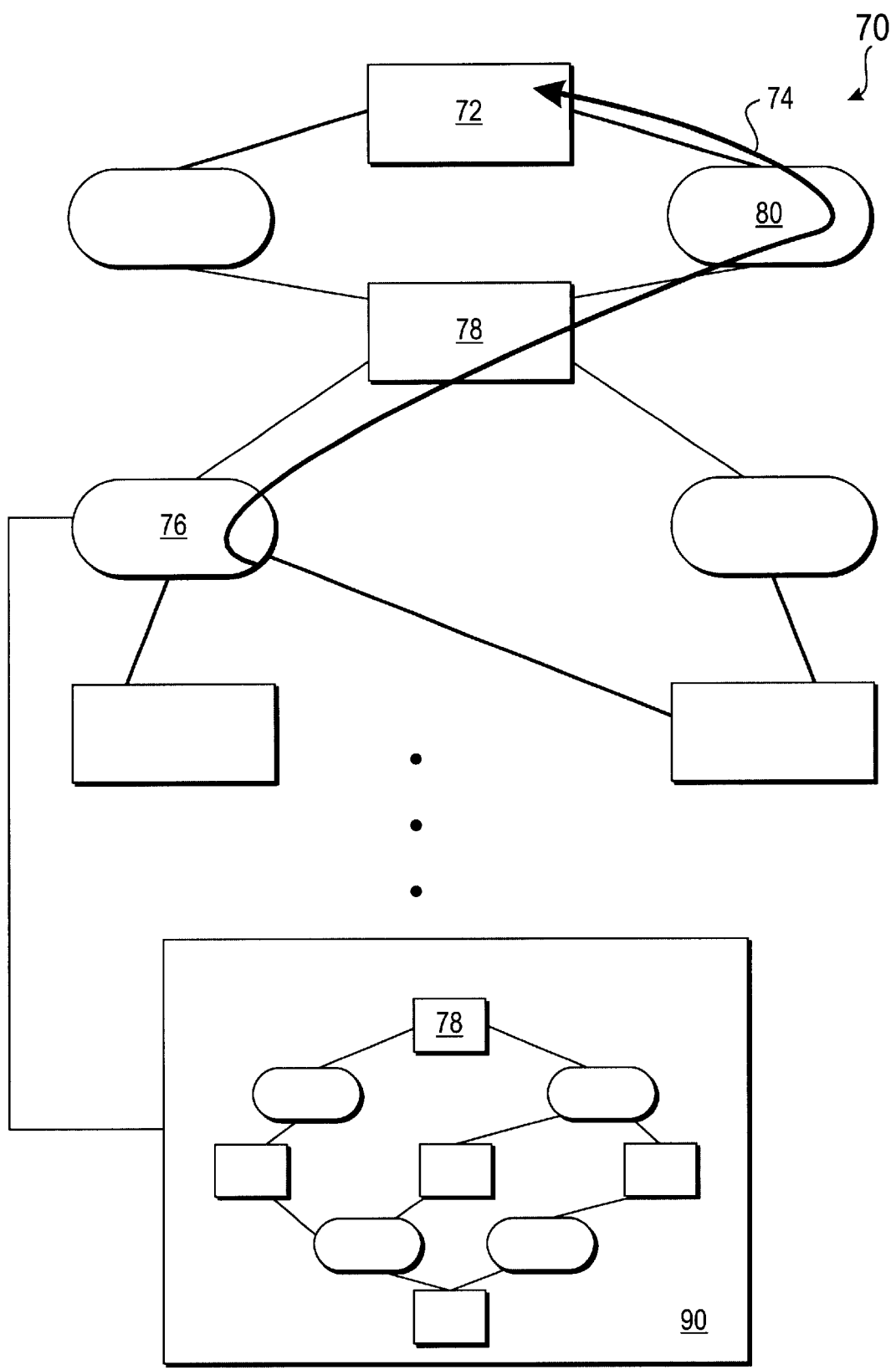
FIG. 3 illustrates an example of the hierarchical nature of a model having task nodes and state nodes organized for use according to an embodiment of the present invention.

As indicated above, an embodiment of the model may be hierarchical in nature in that one or more task nodes themselves may be further represented by other embodiments of the model. An example of this hierarchical nature is illustrated in FIG. 3. In the drawing, a model 70 is illustrated in part. Model 70 is a virtual representation of a manufacturing environment that produces product, as represented by state node 72. Notice that multiple routes are defined by model 70, each route including its own state nodes (shown as rectangles) and task nodes (shown as ovals), some of which may be shared between routes. As explained above, these various routes each define bills of materials and bills of resources that may be used to produce the final product. A particular route (i.e., a workflow) is defined by path 74, which includes task node 76, state node 78 and task node 80. When the process represented by task node 80 operates on the item represented by state node 80, the product represented by state node 72 is produced.

Assume now that model 70 is used by a manufacturer that subcontracts the work to be performed by the process represented by task node 76. For the manufacturer, this process is a self-contained unit that ultimately delivers the item represented by state node 78. The manufacturer need not be concerned with the manner in which the item represented by state node 78 is actually produced. Thus, model 70 need only include a representation of the process used to deliver that item (i.e., the granularity of task node 76 is such that an entire subcontracted manufacturing process is represented).

The subcontractor employed by the manufacturer, however, is very much concerned with the manufacturing process represented by task node 76 in model 70. Indeed, as shown in FIG. 3, the entire subcontracted manufacturing environment may itself be represented by a model 90, which has similar structure to that of model 70. That is, model 90 is a break down of task node 76, created to have the same logical semantic structure between task nodes and state nodes as in model 70. Because model 90 uses the same directed graph approach, should the manufacture who relies upon model 70 to assist in scheduling and other tasks (e.g., order promising, etc.) wish to identify potential bottlenecks, model 90 could be substituted for task node 76 in model 70. In such a case, the scheduler could identify problems that might not otherwise be detectable by the manufacturer. Thus, model 70 is hierarchically arranged such that any task node may be expanded to its own directed graph representation using a similar model structure.

Figure 4A:
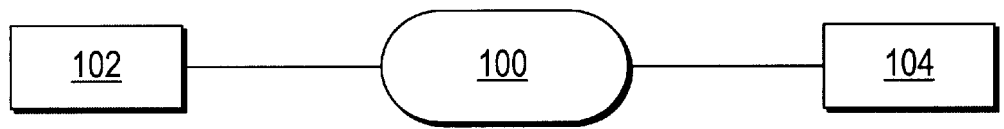
FIGS. 4A, 4B and 4C illustrate a printing process modeled by one or more task nodes according to a desired level of granularity for a model having task nodes and state nodes organized for use according to an embodiment of the present invention.

Task nodes may also be defined at various levels of granularity as follows. In FIG. 4A, a task node 100 represents a transformation process between state nodes 102 and 104. Returning to the print shop metaphor discussed above, task node 100 may represent a document printing process employing any printer and any printer operator. At this level of granularity, the process represented by task node 100 is very coarse, in that the print shop owner is concerned only with the document printing process and not individual printing machines/operators.

Figure 4B:
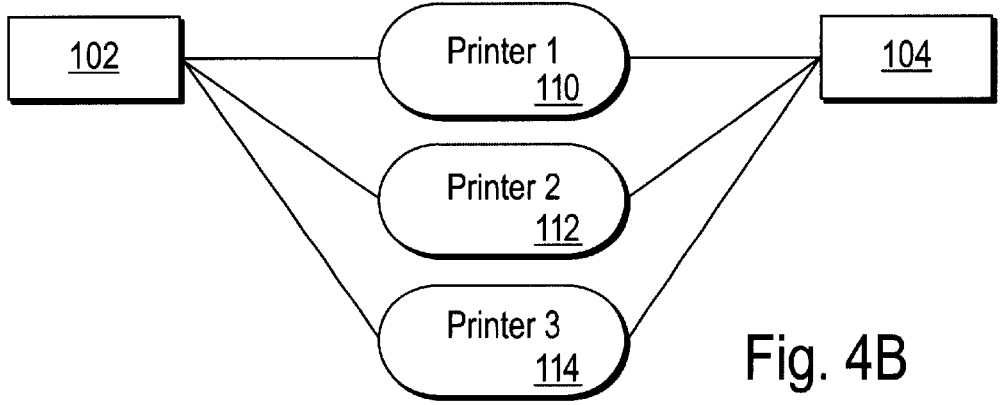

FIG. 4B now illustrates the same document printing process, however, this time task nodes 110, 112 and 114 have been used to represent the process as performed by three different document printing machines. At this level of granularity, a model that included task nodes 110, 112 and 114 would provide different routes to produce the item represented by task node 104, differentiated by printing machine, but not by individual operator.

Figure 4C:
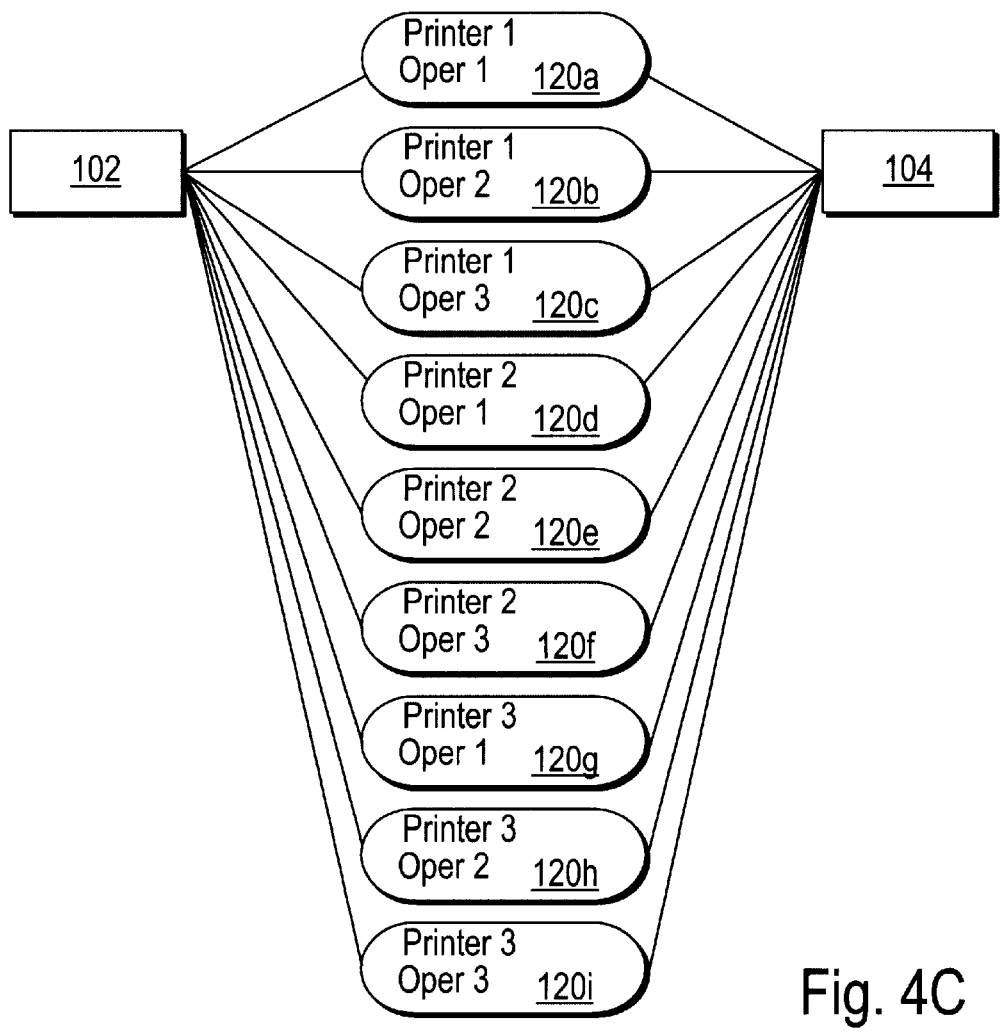

FIG. 4C illustrates the same document printing process, however, at a level of granularity that accommodates an identification of several different operators, each capable of using one or more of the possible printing machines. Task nodes 120a–120i may be included in a model where significant or important differences (e.g., in execution time, capacity, etc.) between operators and/or printing machines is important. Thus, including such detail provides an associated scheduler with multiple possible routes for scheduling production processes. Notice that any of thee or other levels of detail may be accommodated in a model of the manufacturing environment of interest without deviating form the overall structure of the directed graph discussed above.

Similar to the manner in which task nodes may be employed at various levels of granularity, state nodes may also be used to represent any desired inventory item in the production process of the manufacturing environment being modeled. Thus, entire subassemblies may be represented in some cases, while in other cases lesser items may be included. Of course, corresponding task nodes will be needed to properly represent the processes used to produce the items represented by the state nodes.

Figure 5:
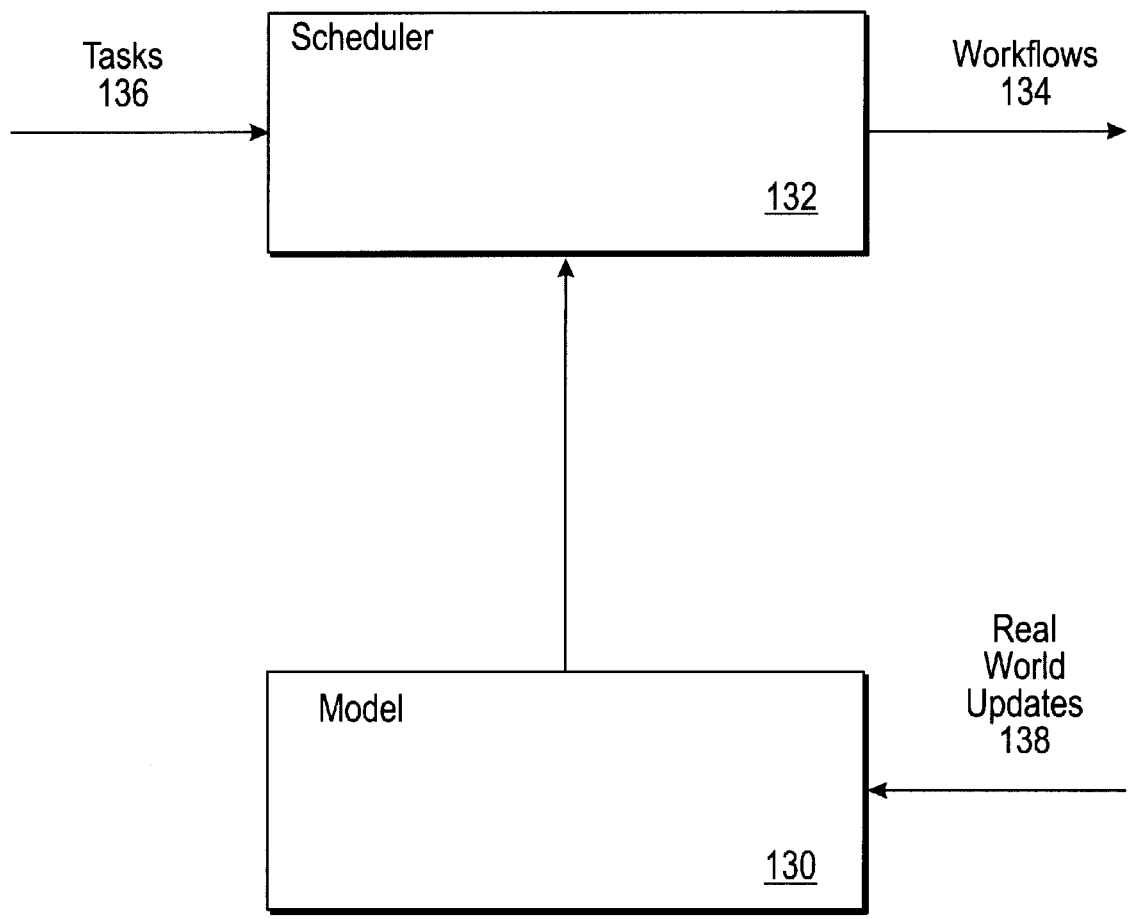
FIG. 5 illustrates an example of a scheduling system employing a model having task nodes and state nodes organized according to an embodiment of the present invention.

FIG. 5 illustrates one example of how a scheduler may make use of a model configured in accordance with the teachings presented herein. Note that the scheduler and the model may each be implemented in a computer system having a general-purpose processor and an accompanying memory and input/output system. The scheduler, for example, may represent executable or other code representing a series of computer-readable instructions to be executed by the processor in accordance with the discussion provided below. Similarly, the model may exist as a computer readable database or other file accessible by the processor (e.g., stored in memory).

Model 130 is configured as a directed graph to represent a real-world manufacturing environment as described above. Thus, model 130 includes multiple routes between alternating series of state nodes and task nodes to represent various ways in which a product may be produced. Scheduler 132 is permitted to access model 130 so as to produce workflows 134 in response to tasks 136. Tasks 136 may represent orders that are being placed for processing within the manufacturing environment, carry-overs from previous orders (e.g., that were not completed during previous shifts, etc.) or other requirements. Workflows 134 represent the route through model 130 chosen by scheduler 132 for completion of individual tasks 136. That is, each workflow 138 represents a detailed set of instructions to complete a task (i.e., to produce a product called for by the associated tasking 136). Model 130 may be continually updated to accurately reflect the real-world manufacturing environment, which it represents. Thus, as various operators take breaks or are replaced with new workers, and/or as machines are rotated in and out of service and/or as items in a particular bill of materials are completed or delayed due to equipment failure, model 130 is updated. This allows scheduler 132 to update workflows 134 to account for the changes in the real world environment.

To produce workflows 134, scheduler 132 may determine which of the number of possible routes represented in model 130 are available to process each tasking 136 and may then provide work assignments accordingly. For example, scheduler 132 may determine which routes are unavailable by determining which processes represented by task nodes in model 130 are already filled to capacity and decide to schedule new tasks 136 along routes that do not include those task nodes. Of course, many other scheduling methods are known in the art and may be used to produce the workflows 134. Preferably, scheduler 136 is a hierarchical process that incorporates an aggregate planning level and a detailed scheduling level as discussed below.

Figure 6:
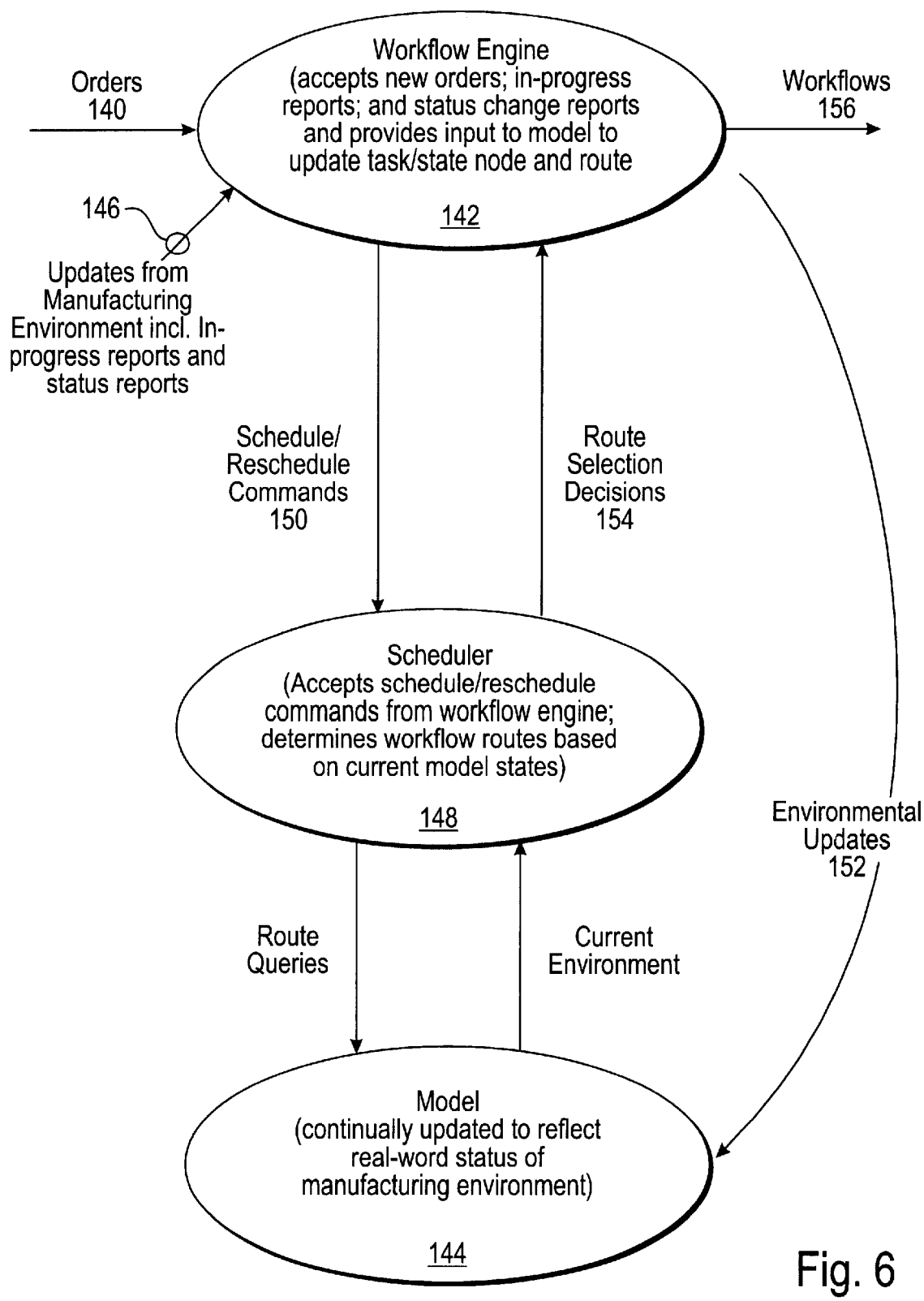
FIG. 6 illustrates a further example of a scheduling system configured in accordance with an embodiment of the present invention.

FIG. 6 illustrates an alternative system for generating workflows in accordance with yet another embodiment of the present invention. In the system, orders 140 are applied to a workflow engine 142. The orders may represent requests for products that are produced in a manufacturing environment represented by model 144. Model 144 may be a model organized in the fashion discussed above (e.g., as a directed graph with alternating series of state nodes and task nodes, etc.) or a model organized in another fashion. In response to orders 140 and/or updates 146 received from the real world environment represented by model 144, workflow engine 142 calls upon scheduler 148 to provide scheduling information.

These calls are made in the form of schedule or reschedule commands 150. In response, scheduler 148 queries model 144 to determine available routes for product completion that may be available. For example, where model 144 is configured as described above, scheduler 148 may examine routes as alternating series of state nodes and task nodes, and assess each complete route through the model 144 on the basis of one or more selection criteria. These criteria may be as simple as finding a viable route (i.e., any complete path through the model), to more complex selections involving a determination of the effect of loading particular manufacturing processes (as represented by task nodes) with additional projects (corresponding to new orders, etc.), to custom value maximizing selection decisions. Again, it is preferable that scheduler 148 perform this route selection procedure in a hierarchical fashion, employing an aggregate planning level and a detailed scheduling level.

In any event, model 144 accurately reports the current state of the manufacturing environment to scheduler 148. This state is continually updated according to updates 152 provided by workflow engine 142. Workflow engine 142 receives update information (e.g., representing task completions, state availability, process availability, resource availability, etc.) and provides the necessary update information 152 that allows model 144 to accurately reflect the current state of the real world.

Scheduler 148 relies on the real world state reflected by model 144 to produce route selection decisions 154. These route selection decisions (made in accordance with the scheduler's rules for such selections) form the basis for the workflows 156 returned by workflow engine 142. Such workflows may be returned any time new orders 140 are placed, in response to events that affect the real world environment represented by model 144, or upon user request (e.g., at the start of a new shift in the manufacturing environment).

As indicated, the scheduling task is preferably accomplished in two (or more) stages. At the lowest level of this hierarchical approach to scheduling, an aggregate planner is used. The aggregate plan produced thereby then provides heuristic guidance to/for a detailed scheduler that may be used to determine a detailed timeline and/or sequence for the job requests. The aggregate planner relies on a bin packing scheme wherein "bins" correspond to individual (or groups of) manufacturing processes, e.g., as represented by task nodes in the model of the manufacturing environment. The capacity of the bins is determined by the resources available to perform the processes they represent and may be weighted to account for differences between work shifts, operators, etc. The bin packing performed by the aggregate planner is, in essence, a route selection procedure and allows bottlenecks in the manufacturing environment to be identified. The bin packing is performed in multiple dimensions and alternative routes (i.e., contingencies) are accounted for to identify an optimal or viable plan.

The selection of which jobs to perform then is the task of the aggregate planner (and the detailed scheduler). The manner in which this task is accomplished may be considered with reference to the following. Suppose N job requests are awaiting scheduling. The jobs may each have an inherent value V and a cost (with respect to a particular operation) to complete C (here, cost may be measured in time or other units). Thus, the N jobs may be plotted as a function of their values versus cost. The goal of any manufacturing environment (or at least the owners thereof) is to choose (i.e., schedule) the subset of the N jobs that will return the highest value without exceeding a cost threshold $C_{th}$.

Nominally, scheduling these N jobs to achieve this goal becomes a $2^N$ problem. For any appreciable N, such a task becomes difficult and requires significant time to process (e.g., if every combination of subsets of the N jobs is to be evaluated to find the best total V without exceeding $C_{th}$). In a sense, the process of examining every combination of the jobs is a one-dimensional bin packing problem where a particular job J is either included in the solution or not. The order of the jobs is at this point irrelevant.

The present aggregate planner, however, dramatically reduces the complexity of this task by optimizing the bin packing process. In essence, the jobs are grouped into "buckets" (i.e., cost buckets) and arranged into ordered lists therein. Note, although the concepts of bins and buckets may seem similar, they are in fact different. The bins are used to represent the resources available in the manufacturing environment. The buckets represent groupings of jobs having similar characteristics, e.g., costs.

The bucketing and ordering procedures are accomplished by resolving the question of whether one is willing to say that no "good" solution to the scheduling task that includes a particular job $J_1$ will not also include a job $J_2$. That is, the solution will either have no jobs from a particular bucket, the most valuable job from that bucket, the top two (as measured in terms of their values) jobs from that bucket, and so on. In other words, there will never be a solution that includes the second most valuable job from a bucket without also including the most valuable job from that bucket, etc. Thus, the jobs are organized in ordered lists according to value within each cost bucket.

Whereas the original scheduling problem was of the order of $2^N$, the bucketing processes described above reduce the complexity of the task to a function approaching $(N/M+1)^M$, where M represents the number of buckets (indeed, this expression will be true for applications wherein buckets of uniform size are used). To illustrate, consider a situation where 5 jobs (A–E) are to be scheduled. If no bucketing is used, then any solution of which of the 5 jobs to perform must account for cases where any one job is either selected or not, i.e., there will be 32 ($2^5$) possible solution sets to choose from. Now, if only 2 of the 5 jobs are grouped into a single bucket, such that either none, one or both of the jobs is performed, the overall number of possible solutions is reduced to 24 (i.e., $2^3*3$). Thus, this simple grouping (using a single bucket of 2 jobs) has reduced the number of possible solutions by 25%. Now, if the 5 jobs can be arranged into 2 buckets of 2 and 3 jobs, respectively, the total number of solutions is reduced to 12 (3*4).

Notice further, if M=N, i.e., no bucketing, we are left with the original one-dimensional bin packing problem and the solution is once again $2^N$. On the other hand, if all the jobs can be collected into a single cost bucket, i.e., M=1, the solution is trivial: N+1. That is, if all the jobs can be treated as if they have the same cost, we can pick jobs in the order of their respective values (including the 0 solution) until $C_{th}$ is reached. It should be appreciated, however, that this trivial solution is rarely, if ever, encountered in a real world environment.

In short then, the bin packing optimization employed by the aggregate planner recognizes that where a situation is presented in which a selection from a number of jobs must be made, grouping the jobs into subgroups in such a way that if a subordinate member of a particular subgroup is to be included in a solution set, the lead and all other superior members of that subset must also be included.

Thus the aggregate planner performs the bin packing process by first organizing the jobs for each manufacturing process represented in the model into subgroups according to the cost of the jobs and ordering the subgroups in terms of their values. Next, jobs from each of the cost buckets are selected to pack the bins, until a cost threshold of one of the bins (not necessarily the bin under consideration) is met. However, it must be remembered that each manufacturing process may measure costs differently. For example, the cost of printing (e.g., in terms of time) may be proportional to the number of pages to be printed, but the cost of binding may be proportional to the number of books to be bound regardless of the page count. The reality of these different costs for different processes adds multiple dimensions to the bin packing problem. In essence, each job has multiple costs associated with it and so each cost/value bin packing operation must be examined to determine which process presents a limiting constraint. In other words, because the end goal is to determine the best subset of jobs for the entire print shop, not just a particular stage or process therein, each task node of the model must be tested.

Testing the multiple constraints requires that as jobs are being selected for one of the task nodes (e.g., the printer) according to the value/cost groupings for that node, the other nodes are examined to determine whether their respective buckets (bins) overflow. That is, as jobs are selected according to the printer value/cost optimization, does the binder (for example) exceed its cost threshold? If the cost threshold of one of these other nodes is exceeded, it is an indication that the process represented by that node is a limiting constraint for the subset of jobs under consideration. Thus, rather than choosing jobs optimized for the first node (i.e., the printer), jobs should be chosen for the node that overflowed (e.g., the binder). Of course, it must be remembered that this second node (the binder) may have a different value/cost optimization, so the subset of jobs that is selected may be different than the original subset. In some cases this will lead to yet another bin representing another node exceeding its cost threshold before the bin representing the node under test (the binder in this example) is filled. Where no single limiting factor can be found, the aggregate planner may choose a subset of jobs that provides the best overall value.

Thus, the aggregate planner accounts for the multidimensional aspect of the manufacturing environment. However, it must also account for the multiple alternative routes identified in the model. For example, any of a number of print machines may be used. Each of these printers may have different costs and each must be accounted for. Thus, the aggregate planner performs the multidimensional bin packing procedure for each alternative route until a best (or sometimes just an acceptable) subset of jobs is identified. Further still, in some cases, at least some of the jobs may have related costs, for example where set up costs may be shared or eliminated depending upon the order in which the jobs are performed. Also, some jobs may be too large to run as a single job and so having to split the job into multiple segments may necessitate having to assign different costs to each segment. The bucketing process may be implemented to account for such aggregation or splitting of jobs.

Of course, once the ordered lists of jobs in the various cost buckets have been produced, the problem remains which jobs to select to pack the bin representing the task node under consideration. Various approaches may be adopted. For example, one approach would be to try each combination of jobs, remembering that no subordinate member of an ordered list may be chosen without also selecting the superior members of that list. Then, each set of jobs that remained within the cost threshold for the node could be added to a solution set, and the member of the solution set with the best overall value could be chosen as the subset of jobs to perform.

An alternative approach uses a sweeping technique for examining the job sets. In essence, the ordered lists are examined in a sweep fashion (e.g., by adding one job from each bucket to the list of jobs to do) until a job set that does not exceed the cost threshold and has a local value maximum is found. This job set becomes the selected set for the bin packing operation. Although this sweeping technique is not guaranteed to produce the optimal job set, it is expected to provide an acceptable job set.

Figure 7:
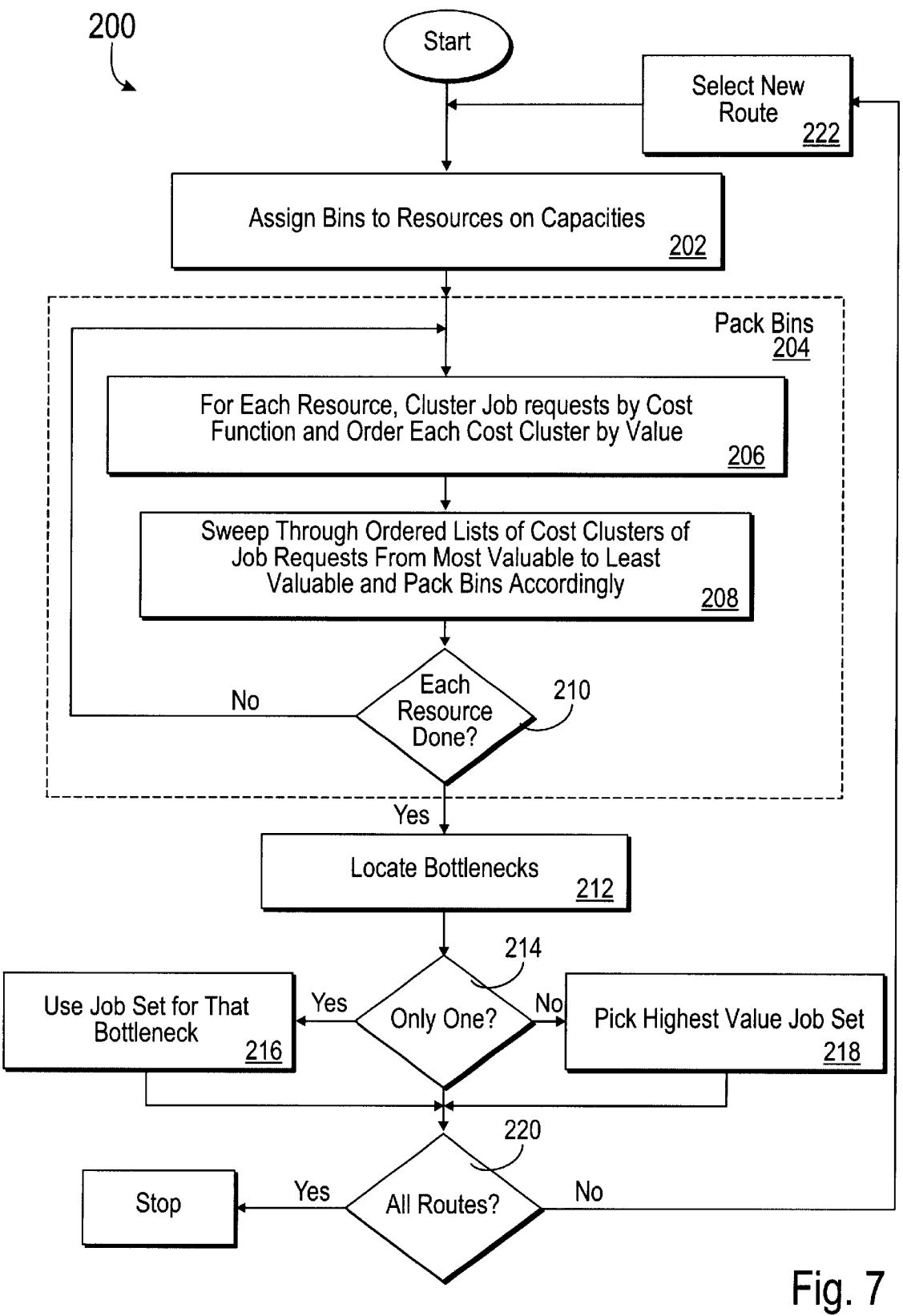
FIG. 7 illustrates a flow diagram of the processes employed by an aggregate planner according to one embodiment of the present invention.

Thus, an aggregate planning scheme has been described. To summarize, consider the flow diagram of FIG. 7. The aggregate planning process 200 begins by representing each task node of a model of a real world environment as a bin to be packed with jobs. This process is represented by step 202 where the bins are assigned to the resources. The depths of the bins are set according to the capacity of the manufacturing processes represented by the nodes. The bins are then packed at process 204 according to an optimization approach, wherein ordered lists of jobs (determined as functions of value vs. cost) are examined in order to form the resulting packed bins. The costs and values may be measured in applicable terms, such as time and money, etc. The bin packing process 204 is performed in multiple dimensions to reflect the fact that each task node (i.e., each process represented by a task node) may have different value/cost criteria.

More specifically, the bin packing process 204 includes a procedure 206 wherein, for each resource (e.g., a manufacturing process represented by a task node), the available jobs are clustered into cost buckets and the jobs within each cost bucket ordered according to value. Each resource may have its own value/cost function, so the various ordered lists of cost buckets may not be the same for each resource.

Once the ordered lists of jobs are available, a resource (e.g., a print operation) is chosen for optimization, and the bins associated with the resources are packed with job requests selected from the ordered lists associated with the selected resource. The job requests are selected at step 208, for example using a sweep technique from most valuable jobs to least valuable jobs.

Thus, to continue the above example, if the print process is chosen for optimization, the ordered lists of jobs associated with the cost buckets developed for the print process are used and the bins of the various resources are packed with jobs according to the selection process. Each resource is optimized in this fashion (step 210) so that the multidimensional aspect of the problem is accounted for.

As the bins representing the manufacturing environment resources are packed, the bin packing process 204 looks for overflows that identify bottlenecks (step 212). That is, as bin packing is performed for the job sets optimized for the printing process, the aggregate planner looks for overflows in all the bins. If the print bin overflows first, the print process is recognized as the bottleneck. However, one of the other bins may first overflow. Thus, the manufacturing process associated with the overflowed bin is recognized as a limiting factor for the job set under consideration and so the job set associated with the limiting factor is then tested. This continues (step 214) until the job set under test causes the bin associated with that job set to overflow or a looping process is detected. Where the job set under consideration (i.e., the job set produced by examining the ordered lists optimized for a particular manufacturing process or task node) causes the bin associated with its own manufacturing process to overflow, that job set is used as a solution (step 216). Alternatively, if the looping process wherein a job set optimized for one resource causes the bin associated with another resource to overflow first, and when an attempt is made to pack bins using the job sets associated with that other resource cause a bin associated with yet another (or even the first) resource to overflow, etc, then the highest value job set can be chosen (step 218).

In addition, each alternative route identified by the model is tested (steps 220 and 222), so that a set of jobs J may utilize any of a number of available processes to complete. The aggregate planner thus identifies a subset of the jobs that provide a best (or acceptable) overall value without exceeding a cost threshold.

Although the foregoing specification and accompanying figures discuss and illustrate specific embodiments, it should be appreciated that the present invention is to be measured only in terms of the claims that follow.

What is claimed is:

1. A method comprising producing an aggregate plan for a set of job requests to be processed in a manufacturing environment given capacities for resources of the manufacturing environment, the capacities being represented by bins in multiple dimensions, some of which may be used by the jobs on an alternative basis, by selecting a subset of the job requests according to a procedure for packing the bins in which a selection is made from among ordered lists of the job requests grouped according to costs for one or more of the resources.

2. The method of claim 1 wherein the ordered lists of job requests are ordered in terms of value.

3. The method of claim 2 wherein at least some of the job requests have different values versus cost for different ones of the resources.

4. The method of claim 3 wherein the manufacturing environment comprises a print shop environment.

5. The method of claim 3 wherein each alternative is represented as a separate bin.

6. The method of claim 3 further comprising developing a detailed schedule from the aggregate plan, the detailed schedule differing from the aggregate plan by including a timeline for the selected jobs.

7. The method of claim 1 wherein the manufacturing environment is represented by a declarative model including a first number of state nodes and a second number of task nodes interconnected with the state nodes, the bins being associated with the task nodes.

8. The method of claim 1 wherein the manufacturing environment is represented by a model that includes the resources consumed by the job requests.

9. A method of producing an aggregate plan for a number of job requests, comprising selecting from among a plurality of routes that define a manufacturing environment, one or more routes by which one or more products corresponding to the job requests are to be produced within the manufacturing environment, each of the plurality of routes including inventory items and resources that act on the inventory items, wherein the selecting procedure is accomplished using a bin packing process in which bins represent the resources that act on the inventory items and the bin packing process is optimized by grouping two or more of the job requests into one or more ordered lists of jobs having similar costs before the selecting procedure is initiated.

10. The method of claim 9 wherein the ordered lists of jobs are arranged in terms of job value.

11. The method of claim 10 wherein the bin packing process comprises selecting jobs from the one or more ordered lists of jobs until a cost threshold for a first resource of the manufacturing environment is reached.

12. The method of claim 11 wherein if, while selecting jobs from the one or more ordered lists of jobs, a cost threshold for a second resource is reached before the cost threshold of the first resource is reached, the second resource is designated as a bottleneck and the bin packing process is recommended so as to optimize for the bottleneck.

13. The method of claim 12 wherein multiple alternative ones of the routes are accounted for while selecting jobs from the one or more ordered lists of jobs.

14. The method of claim 11 wherein multiple alternative ones of the routes are accounted for while selecting jobs from the one or more ordered lists of jobs.

15. The method of claim 11 wherein selecting jobs from the one or more ordered lists of jobs is accomplished using a sweeping process wherein jobs from each of the ordered lists of jobs are selected.

16. The method of claim 15 wherein the jobs are clustered and/or split according to cost savings and/or extra costs to be incurred before being arranged into the ordered lists.

* * * * *